United States Patent [19]

Wortman

[11] 4,415,943

[45] Nov. 15, 1983

[54] EQUIPMENT PROTECTOR AND ENERGY SAVING APPARATUS

[75] Inventor: Donald W. Wortman, Central Islip, N.Y.

[73] Assignee: TII Industries, Inc., Copiague, N.Y.

[21] Appl. No.: 370,337

[22] Filed: Apr. 21, 1982

[51] Int. Cl.³ .......................... H02H 3/13; H02H 7/09
[52] U.S. Cl. ........................................ 361/22; 361/33; 361/92; 361/196; 307/597; 307/598; 307/141; 307/141.4; 62/158; 62/226; 62/231
[58] Field of Search ...................... 361/22, 33, 23, 92, 361/71, 75, 59, 196; 307/597, 598, 141, 141.4, 590, 592; 62/158, 157, 231, 234, 226

[56] References Cited

U.S. PATENT DOCUMENTS

3,619,668 11/1971 Pinckaers .......................... 361/22 X
3,817,052 6/1974 Connelly et al. .................. 361/22 X
3,950,675 4/1976 Weber et al. ...................... 361/33 X
4,268,884 5/1981 Ford et al. ............................ 361/22

Primary Examiner—Patrick R. Salce
Attorney, Agent, or Firm—Martin Sachs

[57] ABSTRACT

An equipment protector and energy saving apparatus includes transient protection as well as under voltage protection by preventing the reduced voltage from being applied to motors and other apparatuses that may be damaged because of insufficient voltage being applied thereto. Provision is incorporated to protect for momentary low voltage transients and turn-on prevention, if the line voltage should be reduced below a predetermined value. Provision is also made for correcting for a small increase in line voltage which may occur when the operating equipment is removed from the line. A timing device may be incorporated therein in order to remove the protected equipment from the line for predetermined intervals of time.

23 Claims, 5 Drawing Figures

EQUIPMENT PROTECTOR AND ENERGY SAVING APPARATUS

BACKGROUND OF THE INVENTION

1. Field of the Invention

The present invention relates to equipment protection and energy saving devices, and in particular, to a circuit arrangement for protecting equipment subject to damage by having a relatively low operating voltage connected thereto.

2. Discussion of the Relevant Art

Many circuit arrangements are known in the art which are designed to prevent damage to compressor motors and other appliances that could be damaged by the application of lower than normal operating voltages. Continuous application of voltage in excess of the normal rating of the equipment is considered rare and have not been of much concern to the inventor. Typical appliances which could readily be deteriorated by the application of less than the minimum rated operating voltage include refrigerators, air-conditioners and other motor-driven devices. The application of lower than specified voltages requires additional current from the source, thereby causing overheating of the motor and eventual burn-out.

In equipment that utilizes compressors associated with driving motors, turn-on of the equipment immediately after an instaneous shut-down causes the equipment to turn-on into an excessively heavy load and may also cause a threatening condition to the motor shortening its life. Typical consumer products are designed to operate from 115 volts RMS+10% at 60 Hz. This means that a minimal voltage of 103.5 volts is acceptable and the equipment should function properly over its normal life expectancy. However, should the line voltage fall to as low as 100 volts RMS overheating would occur in the equipment and possible damage could result. With excessive use of equipment, particularly during the warm summer months, the line voltage, because of overload conditions, has been known to drop much below the 103.5 volts RMS required for the operation of the equipment. Therefore, may circuit arrangements have been devised to remove the equipments from the line voltage during periods of extended time at the reduced or "brown-out voltage". Intermittent or transient low voltage swings have not been much of a problem since they rarely exist for any length of time.

Typical circuit arrangements may be found in U.S. Pat. No. 4,268,884 issued to Ford. Jr., et al on May 19, 1981, which disclose a current sensing circuit that controls a contactor that connects a load to power lines. The circuit arrangement provides an initial momentary delay period after energization of the circuit and before operation of the contactor to permit transients and other short duration irregularities to die out. An immediately succeeding second momentary delay period during which the contactor operation cannot be changed, assures that an initial inrush of current to the load will not cause a fault signal to erroneously operate the contactor. When a fault signal does cause the contactor to be operated, the circuit cannot be set back to its intended operation condition until energization of the sensing circuit is manually interrupted and reestablished. During normal operation of the circuit when current on the power lines is within acceptable limits, the circuit is latched in its proper operating mode.

U.S. Pat. No. 3,950,675 issued to Weber, et al on Apr. 13, 1976, relates to a motor protection device and discloses a circuit arrangement utilized to protect motors, compressors and the like, from conditions of low energizing voltage or momentary voltage interruptions resulting in excessive mechanical load (locked rotor). When the undesirable condition is present, an internal relay prevents the equipment from being energized, with transient conditions being allowed for by means of suitable time delay circuitry.

U.S. Pat. No. 3,619,668 issued to Pinckaers on Nov. 9, 1971, discloses a circuit arrangement which may be used for the control of equipment such as refrigeration compressors and provides for a minimum off-time control. The minimum off-time control includes a resistor-capacitor timing circuit which charges initially from a power source through a transistor, and this is held in a charged condition while the current continues to flow through the transistor to energize a solid-state switch which energizes the contactor supplying power to the equipment being protected. In the event that a momentary interruption of power occurs, or in the event that the power is removed, the capacitor starts to slowly discharge activating a second transistor circuit that shorts out the first transistor so that the output switch cannot be reenergized for a predetermined minimum period of time.

Prior art semiconductor devices utilized in the disclosed circuit arrangements have not had the reliablity desired and freqently, they would not operate at the predetermined threshold because the circuit arrangement was unreliable and/or damaged because of overvoltage transients appearing on the line prior to the undervoltage condition. The present circuit arrangement overcomes the shortcomings found in the prior art by providing overvoltage transient protection, as well as undervoltage or brown-out protection for equipment being protected by the present apparatus.

SUMMARY OF THE INVENTION

Therefore, it is an object of the present invention to provide a reliable and relatively inexpensive means for protecting equipment from the application of low operating voltage.

It is another object of the present invention to provide a circuit arrangement which prevents the undervoltage protection circuitry from turning the equipment off under momentary low voltage conditions.

It is yet another object of the present invention to provide an equipment protector and energy saving apparatus which compensates for a small increase in line voltage once the equipment on the line is removed therefrom because of a low voltage condition.

It is still another object of the present invention to provide an equipment protector and energy saving apparatus that prevents equipment from being turned on again immediately after a turn-off condition.

It is a further object of the present invention to provide an equipment protector and energy saving apparatus which provides for overvoltage transient protection in addition to low voltage brown-out protection.

It is still yet another object of the present invention to provide an equipment protector and energy saving apparatus which includes the use of a timing device associated with the equipment enabling power to be disconnected from the equipment connected thereto for prescribed periods of time.

An equipment protector and energy saving apparatus, according to principles of the present invention comprises, a pair of input terminals and a pair of output terminals. The pair of input terminals are adapted to be connected to an AC source of voltage and the pair of output terminals are adapted to be connected to an equipment load. The AC voltage source is provided with a continuous electrically conducting path from one of the pair of input terminals to one of the pair of output terminals. A power switching means is coupled from the other of the pair of input terminals to the other of the pair of output terminals. Power switching means is in a normally opened position interrupting the electrically conducting path from the other of the pair of input terminals to the other of the pair of output terminals. A control means is coupled to the power switching means for changing the normally open position of the power switching means to a closed position to complete the other electrically conducting path. A voltage sensing means is connected across the pair of input terminals for sensing the magnitude of the AC voltage connected thereto and provides a first signal voltage. The first signal voltage is coupled to the control means to cause the control means to change from a normally high impedance state to a low impedance state causing the power switching means to change to a closed position when the AC voltage exceeds a predetermined magnitude. The control means provides a second signal voltage. A first relatively short timing means is coupled to the control means for receiving the second signal voltage. The first timing means provides a third signal voltage for a predetermined time after the control means provides the second signal voltage. A locking means is coupled in parallel with the control means for holding the power switching means in a closed position responsive to the third signal voltage until the first timing means times out. A second relatively long timing means is coupled to the first timing means for receiving the differentiated third signal voltage. The second timing means provides a fourth signal voltage for a predetermined time after receiving the differentiated third signal voltage only if the input AC voltage is below the predetermined magnitude. A clamping means is coupled to the control means for clamping the control means in its relatively high impedance state responsive to the fourth signal voltage which causes the power switching means to be in its normally open position. A DC power supply is coupled to the control means, the power switching means and the first and second timing means for providing a DC operating voltages therefor from the AC voltage source.

The foregoing and other objects and advantages will appear from the description to follow. In the description reference is made to the accompanying drawing which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
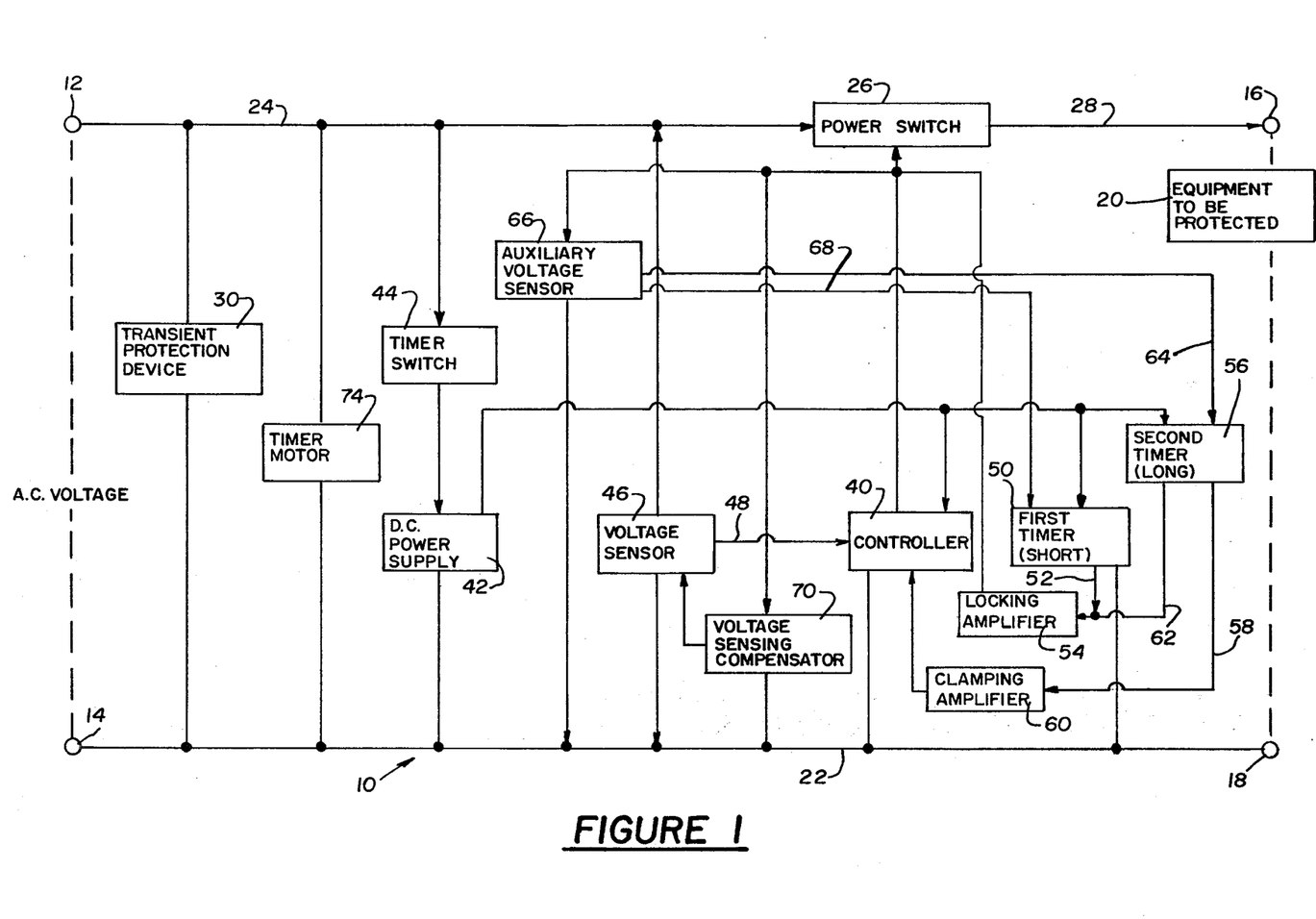
FIG. 1 is a functional block diagram of the equipment protector and energy saving apparatus according to the principles of the present invention.

Referring now to the figures, and in particular, to FIG. 1, there is shown a pair of input terminals 12 and 14 which are suitable for connection to a source of AC operating voltage. A pair of output terminals 16 and 18, suitable for connection to the equipment to be protected 20, are also provided. Input terminal 14 is preferably connected to output terminal 18, thereby providing a continuous electrically conducting path 22 therebetween. Terminal 12 is connected, via an electrical conducting path 24, to one side of the normally open contact of power switch 26, while the other side of the normally open contact of power switch 26 is connected, via electrically conductive path 28, to terminal 16. A transient protection device 30 which may include a gas tube such as that manufactured by TII Industries, Inc., as Model No. 317B connected in series with a surge limiting resistor 34 connected across input terminals 12 and 14 in parallel with a metal oxide varister (MOV) 36 in series with a thermal cut-off device 38. A suitable MOV is manufactured by General Electric Model No. V150 LA20B. A suitable thermal cut-off device is manufactured by Micro-Devices, Inc. Model No. 4178 Al. (See FIG. 2.)

The power switch 26 is operated by a controller 40 which receives its DC operating voltage from the DC power supply 42 which is energized, via a timer switch 44, whose operation will be described in detail hereinafter. A voltage sensor 46 connected across terminals 12 and 14, monitors the AC source voltage providing a first signal voltage which is coupled, via a lead 48, to the input of controller 40 and is present whenever the voltage sensed by voltage sensor 46 exceeds a predetermined value. The first signal voltage appearing on lead 48 will cause controller 40 to change from its normally high impedance state to a low impedance state, thereby changing power switch 26 from its normally open position to a closed position, thus permitting AC current to flow from terminal 12 to terminal 16, via the conducting paths 24 and 28.

A first timer 50, having a relatively short timing cycle, perferably approximately five seconds, is operated from the DC power supply 42 and provides an output signal via lead 52, to locking amplifier 54 which will lock the power switch to its closed state for a period of five seconds. A second timer 56 also energized from the DC power supply 42 has a relatively long time constant, preferably approximately two to three minutes, will provide a fourth signal voltage on lead 58 which is coupled to the clamping amplifier 60 for a two to three minute time period whenever it senses on its input lead 62 the removal of the third signal voltage provided by the output of the first timer 50, via lead 52.

The fourth signal voltage appearing on lead 58, will not appear there for the three minute interval unless the second timer 56 has had the reset voltage, via lead 64 removed, indicating that the controller 40 is in its high impedance state. If the controller 40 is in its high impedance state, timer 56 will receive no reset voltage, via lead 64, and, an output voltage will appear on lead 58 causing clamp amplifier 60 to maintain the controller 40 in its high impedance state for the full three minutes of the second timer, thereby preventing the power switch 26 from turning on again until the three minutes has expired.

An auxiliary voltage sensor 66 provides a signal, via leads 68 and 64, to the first timer 50 and second timer 56, respectively, when the controller voltage changes from its high impedance state to its relatively low impedance state, thereby insuring that the locking amplifier 54 maintains the power switch 26 in its on condition and prevents the second timer 56 from turning the power switch 26 off for short low voltage input transients occuring during the first five seconds after turn-on. In other words, once the power switch is turned on it will remain on until the end of the five second timing interval.

A voltage sensing compensator 70 raises the predetermined low voltage sensing threhsold point so that when the protected equipment, connected across terminals 16 and 18, ceases to draw current when the power switch 26 is open, and the AC input voltage from the source rises a small amount, the power switch will not be turned on again. With an increase in AC source voltage, the power switch 26 would normally be turned on again causing it to switch from its on state to its off state repeatedly. The voltage sensing compensator 70, by causing the sensing threshold voltage to be raised, prevents the power switch from oscillating between its on and off state by requiring that the AC source voltage rise above a higher threshold before turning the power switch 26 to its on state again.

Preferably, the timer switch 44 is provided with three positions; an OFF position, an AUTO position and an ON position. In the OFF position, the timer switch 76 is disconnected from the AC source voltage with the equipment protector and energy saving apparatus 10. In the ON position the DC power supply 42 is connected to the AC source voltage thereby permitting the equipment protector 10 to function. In the AUTO position, the equipment protector 10 is moved from the OFF to the ON position depending upon the position of the cam 72 affixed upon the shaft of the timer motor 74 which is connected across the AC source voltage at all times for operation.

Referring now to FIG. 2 which discloses a preferred embodiment of the various elements described in the functional block diagram of FIG. 1. The input terminals 12 and 14 have connected thereacross the transient protection assembly 30 which includes components 32, 34, 36 and 38 as explained earlier. Also connected across terminals 12 and 14 is the timer motor 74 which has coupled to its drive shaft a cam 72. Cam 72 cooperates with a follower device 76 that cooperates with the timer switch knob 78 of the timer switch 44, which as explined earlier, controls the operation of the equipment protector and energy saving apparatus 10. Terminal 12 is connected, via a conducting path or lead 24 to one contact 80 of switch 26 which functions as the power switch. The other contact 84 of switch 26 is connected, via conducting path or lead 28, to output terminal 16.

The relay 82 is shown with contacts 80 and 84 in its normally open condition, thereby interrupting the electrically conducting path from terminal 12, one of the input terminals to terminal 16, one of the output terminals, even if the contacts 86 and 88 of timer switch 44 are in a closed or ON position. The other input terminal 14 is provided with a continuous electrically conducting path or lead 22 to output terminal 18. Connected across output terminals 16 and 18 is a neon tube 90 which, when illuminated, indicates that AC voltage appears across terminals 16 and 18.

A DC power supply 42 includes diodes 92 and 94, capacitors 96 and 98 and resistors 100 and 102, and zener diodes 104 and 106. The anode electrode of diode 92 is connected to terminal 14, via lead 22 and the cathode electrode of diode 92 is connected to the anode electrode of diode 94. The cathode electrode of diode 94 is connected to one end of resistor 100. The other end of resistor 100 is connected to the cathode electrode of a zener diode 106. The anode electrode of zener diode 106 is connected to terminal 14 and output terminal 18. Capacitor 96 is connected from the cathode electrode of diode 94 to output terminal 18 in parallel with zener diode 104, which has its cathode electrode connected to the cathode electrode of diode 94 and its anode electrode connected to terminal 18. One end of capacitor 98 is connected to the anode electrode of diode 94 and the other end of capacitor 98 is connected to one end of resistor 102. The other end of resistor 102 is connected to contact 86 of timer switch 44. When AC voltage is connected across terminals 12 and 14 and the contacts 86 and 88 of timer switch 44 is closed (placed on the ON condition), the circuit path is completed on the positive half cycle through resistor 102, capacitor 98 and diode 94. Capacitor 98 drops a large AC voltage without dissipating power. With terminal 12 positive relative to the terminal 14, current will flow through resistor 102, capacitor 98 and diode 94 to charge capacitor 96. Capacitor 98 is also charged in the process of conducting current and in order to drop the AC voltage level. When terminal 14 becomes positive relative to terminal 12, for the second half of the cycle current will flow, via diode 92 and resistor 102 to charge capaictor 98 in the reverse polarity otherwise capacitor 98 would charge to one polarity and cease to conduct current due to diode 94. Zener diode 104 preferably will regulate the voltage appearing on capacitor 96 to approximately 50 volts DC. Resistor 100 functions to drop the DC voltage still further and with the aid of zener diode 106 provides 10 volts DC for operating the timers, control circuitry, amplifiers and other logic circuits, as will be explained hereinafter. With the lowest operating line voltage sufficient voltage will be present to allow for proper operation of the logic circuitry and if the voltage should drop below the operating voltage range, the controller 40 (transistors 116 and 118) will cause the relay 82 to drop out, opening the path between contacts 80 and 84 and removing power from the protected equipment connected across output terminals 16 and 18. A diode 18 having its cathode electrode connected to the cathode electrode of diode 94 is placed in parallel (connected across) the coil 110 of relay 82 to reduce voltage kick when the current through coil 110 is cut off. The cathode electrode of diode 108 and one end of coil 110 is connected to the cathode electrode of zener diode 104 by means of a lead 112. The other end of coil 110 is connected to the anode electrode of diode 114 which has its cathode electrode connected to the collector electrodes of the Darlington connected transistor pair 116 and 118.

The emitter electrode of transistor 118 is connected to terminals 14 and 18. The emitter electrode of transistor 116 is connected to the base electrode of transistor 118. The base electrode of transistor 118 is connected, via a resistor 120 to terminal 14. Resistor 122 is connected from the cathode electrode diode 108 to the cathode electrode of diode 114 which connects the coil 110 to the Darlington transistor pair 116 and 118 that function as the controller 40, mentioned earlier.

The voltage sensor 46 includes zener diode 124, preferably having a breakover voltage of 130 volts, diode 126, resistor 128 and resistor 130, all of which are connected in series across the AC input voltage, via contact 86, contact 88, of timer switch 44 to terminal 12 and one end of resistor 130 being connected to terminal 14. The other end of resistor 130 is connected to resistor 128. The other end of resistor 128 is connected to cathode electrode of diode 126. The anode electrode of diode 126 is connected to the anode electrode of zener diode 124 and the cathode electrode of zener diode 124 is connected to contact 86. A capacitor 132 is connected in parallel with resistor 130. The juncture of resistors 128 and 130 is connected, via resistor 134 to the base electrode of transistor 116. Thus, if the AC input voltage increases over a predetermined minimum value determined by the selection of resistors 128, 130 and the value of zener diode 124, it will cause Darlington transistors 116 and 118 to change from their normally high impedance state to their relatively low impedance state. Thus, the 50 volts DC which appear across relay coil 110, diode 114 and transistors 116 and 118 connected in series, either appears across the emitter and collector electrodes of transistor 118 leaving very little voltage to appear across relay coil 110 causing relay 82 to remain unenergized, thereby causing a break in the continuity of the electrical conductive path by opening the contacts 80 to 84, or when transistors 116 and 118 are permitted to be driven to their low impedance state by a voltage appearing at the base electrode of transistor 116 in excess of +1.2 volts DC they will permit almost all of the voltage (50 volts DC) to appear across relay coil 110, thereby causing it to become energized and complete the conducting path between contacts 80 and 84.

Integrated circuit module 136 includes a first portion 138 which functions as the relatively short timer having an interval set for approximately five seconds determined by the value of resistor 140 and capacitor 142. Resistor 140 has one end connected to the cathode electrode of zener diode 106 (B+, 10 v DC source) and the other end thereof connected to terminal 144 of module 136. Terminal 144 is connected to terminal 148 and has connected to it one side of capacitor 142. The other side of capacitor 142 is connected to 14. Terminal 150 of integrated module 136 is connected to terminal 18. Terminal 152 of module 136 is connected to the cathode electrode of zener diode 106 via resistor 139. Capacitor 141 is connected from terminal 150 to terminal 152 of module 136. Terminal 152 is the reset terminal of module 136 and since it is always supplied with a positive voltage in excess of approximately 0.7 volts (except immediately after AC power is applied), the short term timer is alwasy ready to timeout whenever a negative going signal is coupled into terminal 154 of the module. Output terminal 156 of module 136 will provide a DC output voltage of approximately 9 volts for the full five second timing interval once a negative signal has been coupled into terminal 154. Resistor 158 is connected from terminal 182 to terminal 154. Output terminal 156 is connected, via a lead 159 and resistor 160 to the base electrode of transistor 162 which functions as locking amplifier 54. The emitter electrode of transistor 162 is connected to terminal 14. The collector electrode of transistor 162 is connected to the anode electrode diode 108. A positive voltage appearing on the base electrode of transistor 162 will turn transistor 162 to its low impedance state, thereby reverse biasing diode 114 and permitting essentially the entire DC voltage (50 volts DC) to appear across relay coil 110 energizing it and closing the electrical path between contacts 80 and 84. Thus, when AC power is first applied to the equipment protector 10 the timer module 138 would be activated, because the auxiliary voltage sensor 66, which includes resistor 151, 164 and 166 connected in series from the collector electrode of transistor 118 to terminal 14 and capacitor 168 which is connected in parallel with resistors 164 and 166 maintains the juncture of resistor 161 and 164 instantaneously on first turn on at approximately 0 volts while the DC starts to build on the first portion 138 of the relatively short timer 50. The rising voltage across capacitor 96 may cause the voltage across resistor 166 to reach the turn on threshold of transistor 202 before transistors 116 and 118 can be turned on. When transistor 202 turns on, the negative transition on its collector is coupled through capacitor 206 to input 154 of timer 50. Diode 171 is reverse biased by the voltage coupled through capacitor 172 from input terminal 154 of timer 50. Resistor 170 is connected to the anode electrode of diode 171 and discharges capacitor 172 whenever transistors 116 and 118 are off so that when they switch on, a negative pulse can be coupled through capacitor 172 to input 154 of timer 50. However, the RC time constant of resistor 139 and capacitor 141 is selected such that the reset terminal 152, is maintained at the reset level of less than 0.7 volts until well after the trigger pulse generated by transistor 202 has dissipated. Thus, on the initial application of AC power to the apparatus, the timing module is inhibited from triggering unless the AC input voltage is sufficiently high to activate transistors 116 and 118 after the reset terminal 152 has increased to a valve greater than 0.7 volts. Thereafter, if the line voltage has reached the predetermined level or exceeded it, transistors 116 and 118 will turn on to their low impedance state triggering timer module 138 and maintaining relay 82 in its energized condition.

The other half 172 of integrated circuit module 136 functions as a second timer 56 providing an output pulse of between two and three minutes long. The second portion or half 172 of module 136 has its timing function determined by resistor 174 and capacitor 176. One end of resistor 174 is connected to the source of B+ (10 volts DC, cathode electrode of zener diode 106). The other end of resistor 174 is connected to terminals 178 and 180 of module 136. Capacitor 176 is connected from terminal 180 to terminal 18. Terminal 182 is connected to the cathode electrode of zener diode 106. Resistor 184 is connected from terminal 182 to terminal 186 of module 136 which is the signal input terminal for the second timer or second portion 172 of module 136. Terminal 186 is coupled, via capacitor 188, resistor 190 and leads 192 and 159 to terminal 156 of the module 136, and therefore receives a negative going pulse (differentiated signal voltage) just as the short timer 50 of the first portion or half 138 changes from providing a plus output voltage to a zero or low output voltage after five seconds. The long timer 56 provided in the second portion or half 172, however, will not provide an output pulse on terminal 194 unless the reset or activate terminal 196 receives a voltage greater than approximately 0.7 volts coupled, via lead 198 from the juncture of resistors 164 and 166.

When transistors 116 and 118 change to their higher impedance state the voltage appearing on lead 198 will be coupled to terminal 196 and at the same time, this positive voltage will be coupled, via resistor 200 to the base electrode of transister 202, which functions as a gain amplifier for the auxiliary voltage sensor 66 and is caused to conduct current from its collector electrode to its emitter electrode, via resistor 204, which is connected from the collector electrode of transistor 202 to the cathode electrode of zener diode 106 (+10 volts DC). Capacitor 206 couples the negative going voltage to pulse terminal 154 of module 136, thereby insuring a positive output pulse, at terminal 156 and lead 159, 192, resistor 190, capacitor 188 to terminal 186 of module 136. At the same time, the DC voltage from terminal 156 will be coupled, via lead 158 and resistor 160 to the base electrode of transistor 162. Thus a transient of less than a five second duration will not affect the relay locked in its closed condition. However, if the transient persists beyond the five seconds, the negative going edge of the pulse at terminal 156 will cause transistor 162 to become non-conducting releasing the lock and will cause the relatively long timer in the second portion 172 of module 136 to provide an output pulse at terminal 194 for two to three minutes duration. The positive output pulse will be coupled from terminal 194, via lead 208, resistor 209 to the base electrode of transistor 210 which has its emitter electrode connected to terminal 18 and its collector electrode connected to the base electrode of transistor 116. The positive voltage appearing at the base electrode of transistor 210 will cause it to turn on or change to its low impedance state, thereby shorting the base electrode of transistor 116 to the emitter electrode of transistor 118, causing the transistors 116 and 118 to remain in their high impedance state and thereby maintaining relay 82 in its open or non-energized state for the length of time of the output timing pulse. When the output pulse disappears after two to three minutes the transistor 210 which functions as the clamping amplifier 60 will release the controller (transistors 116 and 118) and allow it to respond to the line voltage occurring at that time. Thus, if the unit should be shut off for any length of time it will not be permitted to turn on again until the two to three minutes has expired.

The voltage sensing compensator 70 includes resistors 212 and 214 connected in series from the anode electrode of diode 108 to terminal 18 and, thus, monitors the voltage appearing at the anode of diode 108 which is the voltage on the relay core 110. The juncture of resistors 212 and 214 is connected to the base electrode of transistor 216 which functions as the voltage sensing compensator. The emitter electrode of transistor 216 is connected to terminal 18 and the collector electrode of transistor 216 is connected, via resistor 218, to the base electrode of transistor 116. Thus, when transistors 116 and 118 change to their high impedance state causing relay 82 to return to its normally open condition, the increase in voltage appearing across resistors 212 and 214 is coupled to the base electrode of transistor 216, thereby turning transistor 216 to its on or low impedance state and effectively places the collector resistor 218 in parallel with the series connection of resistors 134 and 130. By paralleling resistors 130 and 134 by another resistor, the voltage sensing ratio is changed, requiring a higher AC input line voltage to occur before transistors 116 and 118 can be changed back to their low impedance state, once turned off.

Figure 2A:
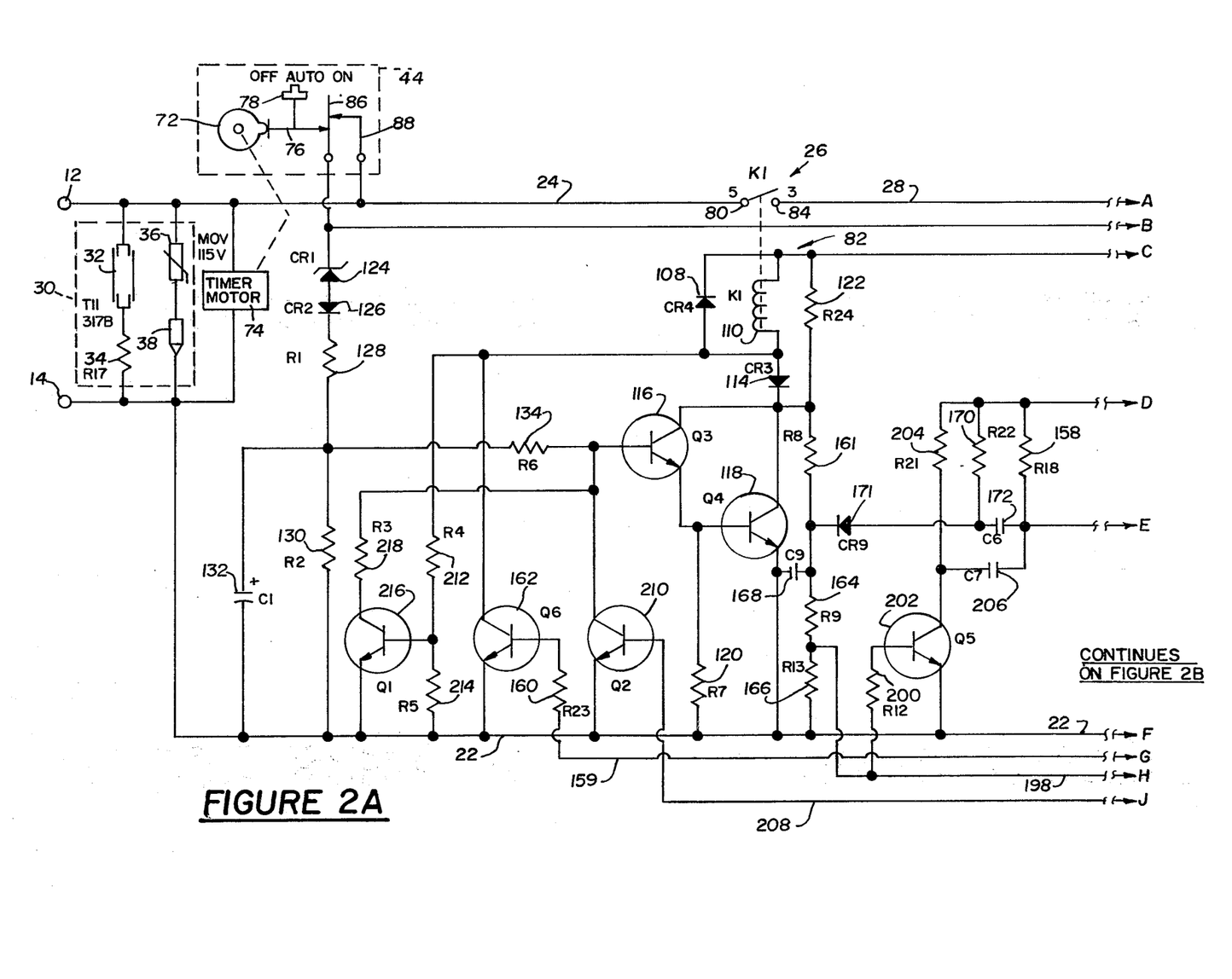
FIGS. 2A and 2B are schematic circuit diagrams of the apparatus shown in FIG. 1.
Figure 2B:
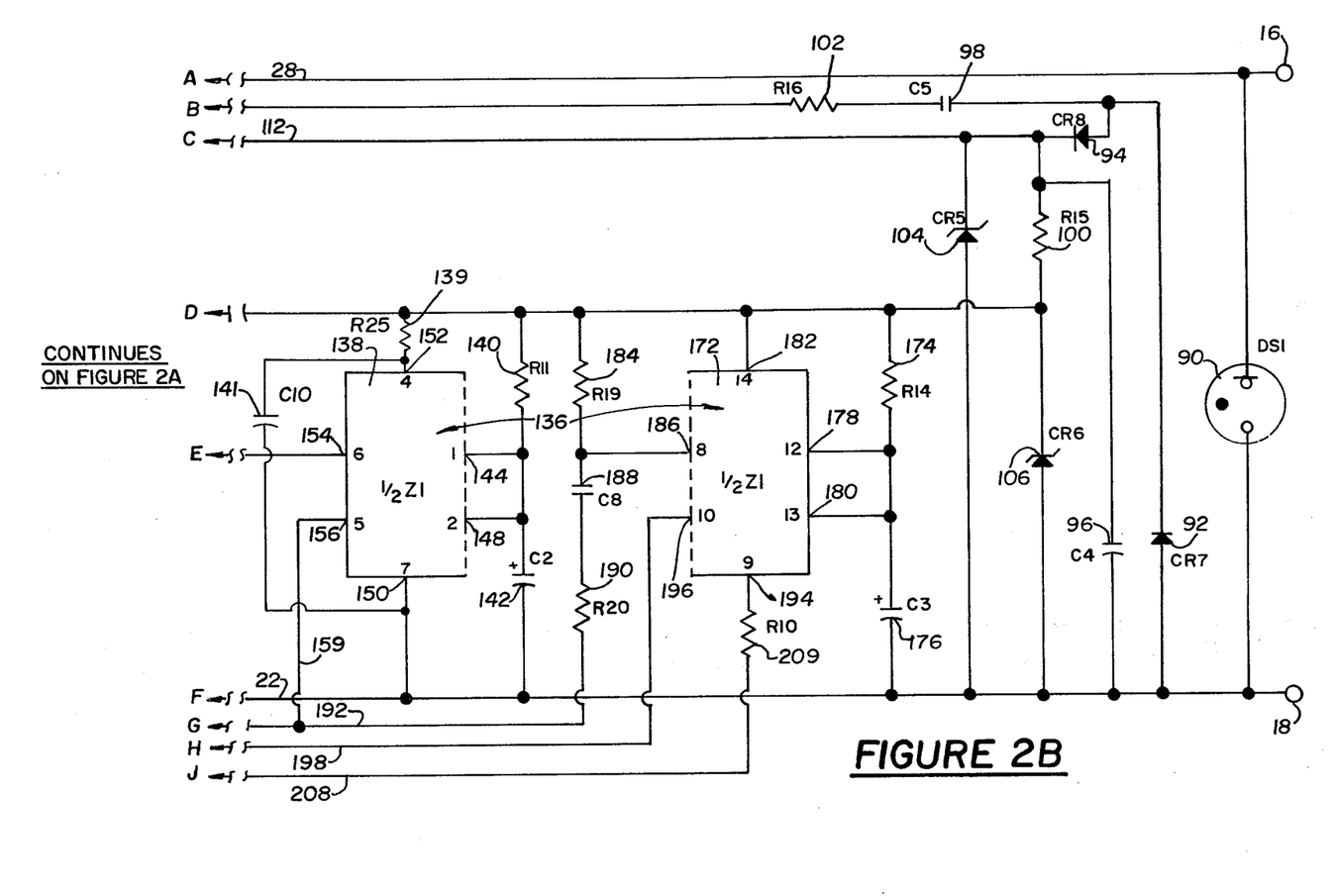
Figure 3:
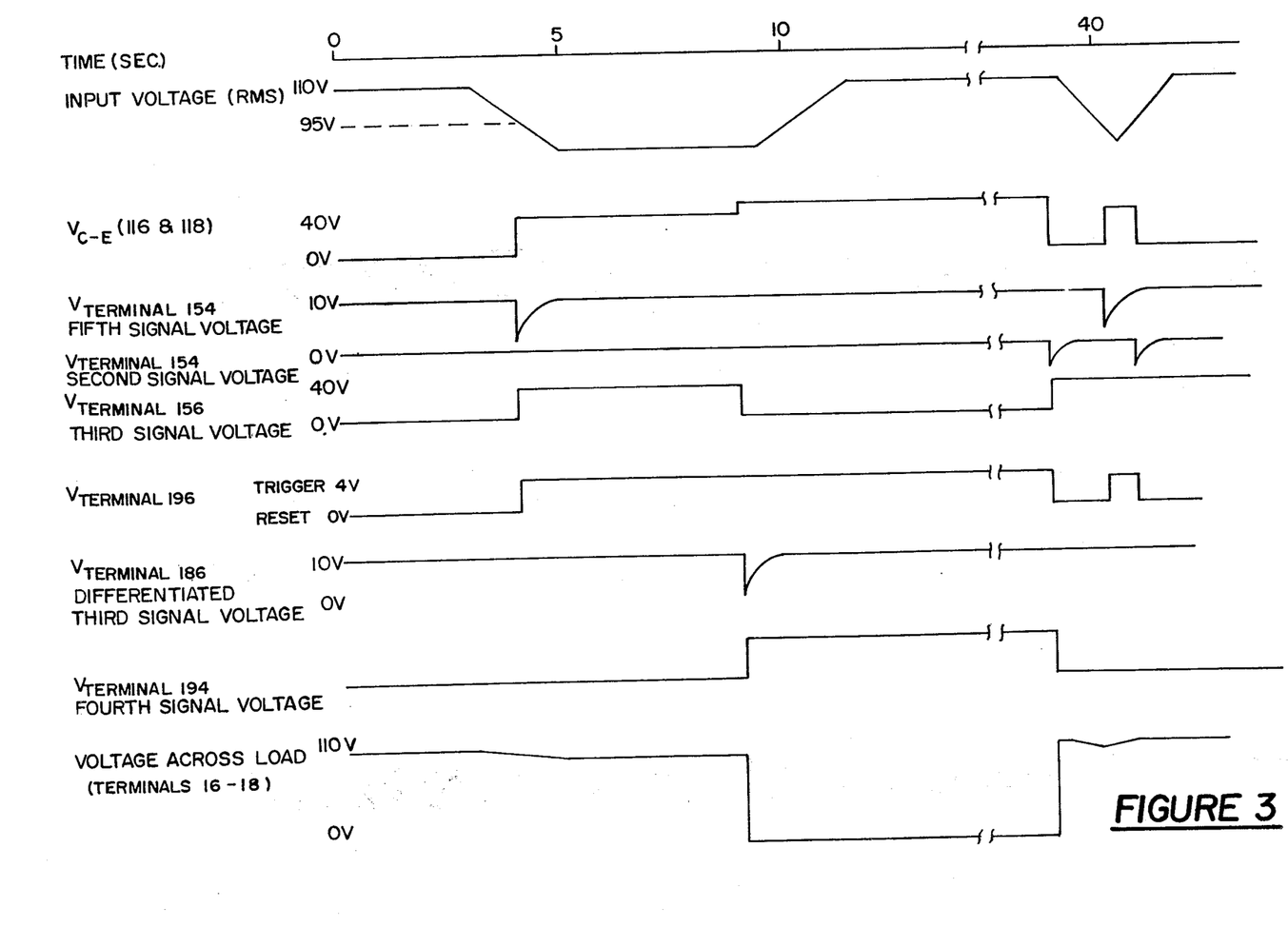
FIGS. 3 and 4 are timing diagrams taken at various points in the schematic of FIGS. 2A and 2B with varying line voltages with respect to time.
Figure 4:
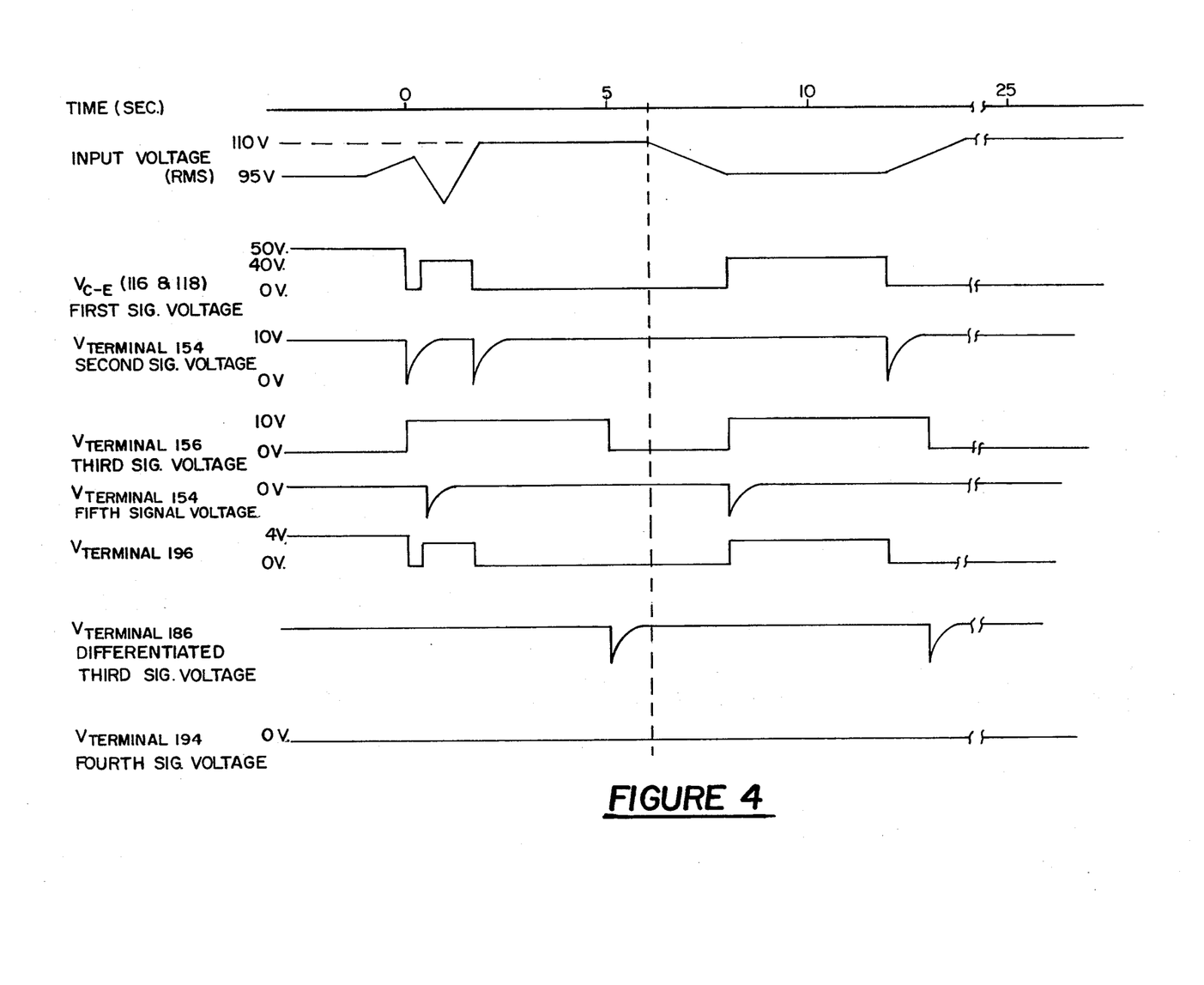

FIGS. 3 and 4 are timing diagrams taken at various points in FIGS. 2A and 2B showing the voltage appearing with respect to a ground reference (terminal 18) at various A.C. input voltage conditions to enable a better understanding of the operation of the presently disclosed circuit arrangement.

In operation, overvoltage transients appearing across terminals 12 and 14 will be substantially removed or clamped by the transient protection device 30. The knob of timer switch 44 may be placed in either the ON or AUTO position, thus permitting equipment to be protected continuously or alternatively be turned on for prescribed intervals of time depending upon the setting of the timer switch programing mechanism, not shown and presently known in the art. Once the equipment is placed in the ON condition DC power supply 42 is energized and the voltage sensor 46 senses the input AC voltage. If the input AC voltage exceeds the predetermined low voltage limit the controller 40 acts to permit power switch 26 to turn on and completes the current path to terminals 16 and 18. Should a momentary low voltage transient occur for a period of time less than five seconds just after turn on, the system will not respond, since it will be clamped in an on condition by the functioning of the first timer 50. After the first timer has timed out, a low voltage condition will cause the second timer 56 to provide an output signal which will change the state of the controller 40, thereby turning the power switch 36 to its off condition breaking the current path to terminal 16 from terminal 12. Should the system be turned off for an instant it will be maintained in the off condition until the second timer 56 times out (two to three minutes). Thereafter, the system will function as if originally turned on and will respond to the input AC line voltage occurring at that time. Capacitor 168 prevents short term transients from falsely turning the unit off. When the system is turned off for a short interval because of a low line voltage condition, the voltage sensing compensator 70 changes the predetermined low voltage sensor ratio so that a slightly higher voltage is required in order to turn the equipment back on. This overcomes the inherent rise in input voltage when the protected equipment is removed from the line and will not permit the system to turn on again immediately. Circuitry such as the locking amplifier 54 and clamping amplifier 60 respond to the output signals provided by the first timer 50 and the second tier 56 to positively lock or clamp the controller in its on or off state, respectively, so that momentary transients cannot effect the condition of the power switch and removes unwanted transients or oscillations thereof.

Listed below is a parts list of the components utilized in the preferred embodiment of the present invention:

| Component Designation | Value |
|---|---|
| R1 (128) | 10K (Ohms) |
| R2 (130) | 24K (Ohms) |
| R3 (218) | 24K (Ohms) |
| R4 (212) | 1M (Ohms) |

-continued

| Component Designation | Value |
| --- | --- |
| R5 (214) | 47K (Ohms) |
| R6 (134) | 18K (Ohms) |
| R7 (120) | 100K (Ohms) |
| R8 (161) | 30K (Ohms) |
| R9 (164) | 10K (Ohms) |
| R10 (209) | 47K (Ohms) |
| R11 (140) | 470K (Ohms) |
| R12 (200) | 5.1K (Ohms) |
| R13 (166) | 5.1K (Ohms) |
| R14 (174) | 51M (Ohms) |
| R15 (100) | 8.2K (Ohms) |
| R16 (102) | 100 (Ohms) |
| R17 (34) | 0.5 (Ohms) |
| R18 (158) | 1M (Ohms) |
| R19 (184) | 100K (Ohms) |
| R20 (190) | 10K (Ohms) |
| R21 (204) | 1M (Ohms) |
| R22 (170) | 1M (Ohms) |
| R23 (160) | 47K (Ohms) |
| R24 (122) | 20K (Ohms) |
| R24 (139) | 10M (Ohms) |
| C1 (132) | 10 (Microfarads) |
| C2 (142) | 10 (Microfarads) |
| C3 (176) | 2.2 (Microfarads) |
| C4 (96) | 22 (Microfarads) |
| C5 (98) | 1.0 (Microfarads) |
| C6 (172) | .1 (Microfarads) |
| C7 (206) | .1 (Microfarads) |
| C8 (188) | .1 (Microfarads) |
| C9 (168) | .33 (Microfarads) |
| C10 (141) | .1 (Microfarads) |
| Q1 (216) | MPS6515 |
| Q2 (162) | MPS6515 |
| Q3 (116) | MPSA05 |
| Q4 (118) | MPSA05 |
| Q5 (202) | MPS6515 |
| Q6 (162) | MPSA05 |
| CR1 (124) | 1M130ZS2 |
| CR2 (126) | 1N4007 |
| CR3 (114) | 1N4148 |
| CR4 (108) | 1N4007 |
| CR5 (104) | 1N5369 51V, 5W |
| CR6 (106) | 1N47401OV, 1W |
| CR7 (92) | 1N4007 |
| CR8 (94) | 1N4007 |
| CR9 (171) | 1N4148 |
| K1 (82) | Aromat Type JA |
| Z1 (136) | ICM7556 |
| DS1 (90) | Neon Lamp |
| Thermal Cutoff (38) | Micro-Devices 4178A1 |
| Timer Motor (74) | Toastmaster 12-036V |
| Gas Tube (32) | TII317B |
| MOV (36) | GE V150LAZOB |

Hereinbefore has been disclosed an efficient equipment protector and energy saving apparatus that is reliable and caplable of overcoming short time transients of the overvoltage type, as well as, low voltage transients occurring across a pair of AC input voltage lines. The apparatus is capable of functioning during brown-out conditions and will adequately protect motor, compressors and the like which must be recycled once turned off before they can be permitted to turn on again in order to preserve their life.

It will be understood that various changes in the details, materials, arrangements of parts and operating conditions which have been herein described and illustrated in order to explain the nature of the invention may be made by those skilled in the art within the principles and scope of the instant invention.

Having thus set forth the nature of the invention, what is claimed is:

1. An equipment protector and energy saving apparatus comprising:

(a) a pair of input terminals and a pair of output terminals, said pair of input terminals being adapted to be connected to an AC source of voltage, said pair of output terminals being adapted to be connected to an equipment load, said AC voltage source being provided with a continuous electrically conducting path from one of said pair of input terminals to one of said pair of output terminals;

(b) power switching means coupled from the other of said pair of input terminals to the other of said pair of output terminals, said power switching means being in a normally opened position interrupting the electrically conducting path from the other of said pair of input terminals to the other of said pair of output terminals;

(c) control means coupled to said power switching means for changing said normally open position of said power switching means to a closed position to complete said other electrically conducting path;

(d) voltage sensing means connected across said pair of input terminals for sensing the magnitude of the AC voltage connected thereto and providing a first signal voltage, said first signal voltage being coupled to said control means for causing said control means to change from a normally high impedance state to a low impedance state and causing said power switching means to change to a closed position when said AC voltage exceeds a predetermined magnitude, said control means providing a second signal voltage;

(e) first relatively short timing means coupled to said control means for receiving said second signal voltage, said first timing means providing a third signal voltage for a predetermined time after said control means provides said second signal voltage;

(f) locking means coupled in parallel with said control means for holding said power switching means in said closed position responsive to said third signal voltage until said first timing means times out;

(g) differentiation means for differentiating said third signal voltage;

(h) second relatively long timing means, coupled to said first timing means for receiving said differentiated third signal voltage, said second timing means providing a fourth signal voltage for a predetermined time after receiving said differentiated third signal voltage only if said input AC voltage is below said predetermined magnitude;

(i) clamping means coupled to said control means for clamping said control means in its relatively high impedance state responsive to said fourth signal voltage causing said power switching means to be in its normally open position; and (j) DC power supply means coupled to said control means, said power switching means and said first and said second timer means for providing a DC operating voltage therefor from said AC voltage source.

2. An equipment protector and energy saving apparatus according to claim 1 further including auxiliary sensing means coupled to said first timing means providing a fifth signal voltage thereto when said AC input voltage momentarily falls below said predetermined voltage, said fifth signal voltage causing said first timing means to provide said third signal voltage to said locking means to maintain said switching means in its closed position until said first timing means times out.

3. An equipment protector and energy saving apparatus according to claim 1 further including compensating means coupled to said voltage sensing means for upwardly modifying said predetermined voltage when said power switching means causes said load equipment to be removed from said AC voltage source.

4. An equipment protector and energy saving apparatus according to claim 1 further including a timing motor and timing switch means, said timing switch means being connected between said DC power supply means and the other of said pair of input terminals for coupling said AC voltage source to said DC power supply in a closed position said timing motor being coupled to said timing switch means for periodically opening and closing said timing switch means according to a predetermined program, said timing motor being connected to said AC voltage source.

5. An equipment protector and energy saving apparatus according to claim 1 further including voltage transient supression means comprising a gas tube and a metal oxide varistor coupled in parallel and connected across said pair of input terminals.

6. An equipment protector and energy saving apparatus according to claim 1 wherein said power switching means is a relay having a coil and normally open contacts.

7. A equipment protector and energy saving apparatus according to claim 1 wherein said control means includes transistor means coupled in series with said switching means, said switching means and said transistor means being coupled across said DC power supply means.

8. An equipment protector and energy saving apparatus according to claim 7 wherein said transistor means comprises a pair of transistors connected in a Darlington configuration with the collector electrodes being coupled to said power switching means, the base electrode of the first of said pair of transistors being connected to the emitter electrode of said second of said pair of transistors, the emitter electrode of the first of said pair of transistors being coupled to said DC supply means, the base electrodes of said second of said pair of transistors being coupled to said voltage sensing means.

9. An equipment protector and energy saving apparatus according to claim 1 wherein said voltage sensing means includes means for obtaining a DC voltage having a magnitude less than the magnitude of said AC voltage coupled to said pair of input terminals and voltage divider means coupled in series with said DC voltage means for providing a DC voltage related to the magnitude of said AC input voltage, said related voltage being coupled to said control means.

10. An equipment protector and energy saving apparatus according to claim 1 wherein said first relatively short timing means and said second relatively long timing means are solid state timing devices having a serially connected resistor and capacitor to determine the timing intervals.

11. An equipment protector and energy saving apparatus according to claim 1 wherein said locking means includes a solid state switch means.

12. An equipment protector and energy saving apparatus according to claim 11 wherein said solid state switch means comprises a transistor having its collector electrode coupled to said power switching means and its emitter electrode coupled to said DC power supply means, the base electrode of said transistor being coupled to said relatively short timing means and responsive to said third signal voltage to maintain said power switching means in a closed condition.

13. An equipment protector and energy saving apparatus according to claim 1 wherein said clamping means includes a solid state switch means.

14. An equipment protector and energy saving apparatus according to claim 13 wherein said solid state switch means includes a transistor having its collector electrode coupled to said control means, its emitter electrode coupled to said DC power supply means, the base electrode of said transistor being coupled to said relatively long timing means and being responsive to said fourth signal voltage to maintain said power switching means in its normally open state.

15. An equipment protector and energy saving apparatus according to claim 1 wherein said DC power supply means comprises:
(a) a first diode, the anode electrode of said first diode being connected to said one input terminal,
(b) a first capacitor,
(c) a first resistor, said first capacitor and said first resistor being connected in series and coupled between said other input terminal and the cathode electrode of said first diode;
(d) a second diode, the anode electrode of said second diode being connected to the juncture of said first capacitor and the cathode electrode of said first diode; and
(e) a second capacitor, said second capacitor being connected from the cathode electrode of said second diode to said one input terminal.

16. An equipment protector and energy saving apparatus according to claim 15 further including regulation means for regulating the DC voltage.

17. An equipment protector and energy saving apparatus according to claim 16 wherein said regulation means includes:
(a) resistance means, said resistance means having one end thereof connected to the cathode electrode of said second diode; and
(b) first zener diode means, the cathode electrode of said first zener diode means being connected to the other end of said resistor means and the anode electrode being connected to said one terminal means.

18. An equipment protector and energy saving apparatus according to claim 17 further including second regulation means for additional regulation of said DC voltage.

19. An equipment protector and energy saving apparatus according to claim 18 wherein said second regulation means is a zener diode having its cathode electrode connected to the cathode electrode of said second diode and its anode electrode connected to said first input terminal.

20. An equipment protector and energy saving apparatus according to claim 15 wherein said serially connected first capacitor is coupled to said other input terminal through the normally open position of said timing switch means.

21. An equipment protector and energy saving apparatus according to claim 2 wherein said auxiliary sensing means is a resistance divider network means connected in parallel with said control means for providing a change in voltage when said control means changes from its relatively low impedance state to its relatively high impedance state.

22. An equipment protector and energy saving apparatus according to claim 3 wherein said compensating means includes:

(a) second voltage sensing means connected in parallel with said control means for sensing the state of said control means and providing a compensating voltage when said control means is a relatively high impedance;

(b) transister means, the emitter electrode of said transistor means being connected to said first input terminal, the collector electrode of said transistor means being coupled through a first resistance means to said power switching means, the base electrode of said transistor means being coupled to said second voltage sensing means for downwardly modifying said first signal voltage.

23. An equipment protector and energy saving apparatus according to claim 4 wherein said timing switch means is provided with three positions, an ON position, an OFF position and an AUTO position whereby said timing switch means is opened and closed at predetermined intervals by said timing motor.

* * * * *